Patented Dec. 22, 1942

2,306,093

UNITED STATES PATENT OFFICE 2,306,093

SUBSTITUTED NAPHTHOQUINONES

Max Tishler, Rahway, N. J., assignor to Merck & Co., Inc., Rahway, N. J., a corporation of New Jersey No Drawing. Application April 6, 1940, Serial No. 328,265

3 Claims. (Cl. 260—396)

This invention relates to gamma substituted propyl derivatives of 1,4-naphthoquinone, intermediates, and processes for their production.

Doisy and others, J. A. C. S. 61: 1295, (May, 1939), Jour. Biol. Chem. 130: 219, 433 (1939), report experiments in which vitamin $K_1$ has been hydrogenated in the presence of a platinum catalyst in acetic acid according to the following scheme:

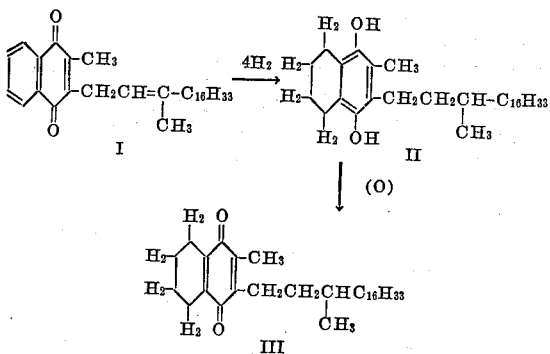

When the hydrogenation product is oxidized, Compound III, 2-methyl-3-dihydrophytyl-5,6,7,8, tetrahydro-1,4-naphthoquinone is formed. Doisy apparently did not isolate and characterize his reaction product.

Doisy's experiments were repeated by me, and their procedure was also modified by the use of various other forms of platinum and palladium catalysts and various other solvents. The hydrogenation product was isolated as the hydroquinone, purified and then oxidized by the usual methods. The product is a golden yellow liquid which, on reductive acetylation, yields a crystalline diacetate which may be crystallized from alcohol. In Doisy's process after hydrogenation of the quinone groups, both the benzene rings and the side chains appear to be reduced simultaneously when the usual platinum or palladium catalysts are used. The first molecule of hydrogen is taken up with extreme rapidity and when the reaction is stopped at this point, the product, after exposure to air, is vitamin $K_1$, indicating that the quinone system is the first to be reduced.

When the reaction is allowed to proceed, hydrogen is absorbed at an almost constant rate until three more molecules of hydrogen have been absorbed. That the reduction is not selective is shown by the fact that when the reaction is stopped after three mols. of hydrogen have been absorbed, appreciable quantities of vitamin $K_1$ or of reduction products which still contain a double bond in the side chain are present. This is indicated by treating a sample of the reaction mixture with alcoholic alkali whereby a transient purple color is formed. This test is characteristic of quinones having a substituted allyl group in the two or three position.

Karrer, Helv. 22: 1515 (Dec. 1, 1939) reports the production of a 2-methyl-3-dihydrophytyl-1,4-naphthoquinone by condensing dihydrophytyl bromide with a 2-methyl-1,4-naphthohydroquinone in the presence of a catalyst. Beyond this, he gives no details.

I have found that gamma substituted allyl naphthoquinones may be selectively reduced to form gamma substituted propyl naphthoquinones. In the case of allylic side chains in which aliphatic alkyl radicals are substituted in the gamma position, the selective reduction is preferably carried out with Raney's nickel as a catalyst in methyl alcohol. Following the absorption of 2 mols. of hydrogen, the reaction proceeds very slowly. By stopping the reduction at this point, gamma substituted propyl naphthoquinones may be obtained in excellent yield.

Where an aryl group is substituted in the gamma position of the allyl side chain, Raney's nickel does not appear to be a suitably active catalyst, and it is necessary to use a catalyst such as palladium.

These gamma substituted propyl naphthoquinones show pronounced antihemorrhagic activity and are useful as therapeutic agents.

In the examples given below, preferred methods of carrying out my invention are illustrated, but it is to be understood that they are given by way of illustration and not of limitation and that modifications may be made by those skilled in the art without departing from the spirit and scope of the invention.

EXAMPLE I

*2-methyl-3(beta gamma dihydrophythyl)-1,4-naphthoquinone*

A mixture of 1 gx. of 2-methyl-3-phytyl-1,4-naphthoquinone, 0.25 gx. of Raney's nickel catalyst and 50 cc. of methanol is shaken with hydrogen at atmospheric pressure at room temperature. About 50 cc. of hydrogen is absorbed in a few minutes and then the absorption slows down to the rate of 3 cc. per minute. After about 100 cc. of hydrogen are taken up, the reaction is stopped and the mixture filtered. The filtrate is diluted with water whereupon a waxy solid separates. The mixture is extracted with petroleum ether, chilled at −10° C. and centrifuged.

The supernatant liquid is discarded and the white waxy residue is washed three times with small portions of cold petroleum ether. The residue is dissolved in ether and shaken with 1 gx. of silver oxide and anhydrous magnesium sulfate. After 15 minutes, the mixture is filtered, and the yellow filtrate concentrated. The product is a golden yellow liquid.

| | Carbon | Hydrogen |
|---|---|---|
| Analysis: | | |
| Calculated | 82.30 | 10.66 |
| Found | 82.35 | 10.71 |

Unlike vitamin $K_1$ (the starting material), the product does not give a transient purple color when heated with alcoholic alkali. It shows pronounced antihemorrhagic activity in chicks at doses of 6 gamma. On reductive acetylation, the product yields a white solid melting at about 56° C.

| | Carbon | Hydrogen |
|---|---|---|
| Analysis: | | |
| Calculated | 78.02 | 10.09 |
| Found | 78.02 | 10.06 |

EXAMPLE II 2-(beta gamma dihydrophythyl)-1,4-naphthoquinone

A mixture of 1 gx. of 2-phytyl-1,4-naphthoquinone, 25 cc. of methanol and 0.25 gx. of Raney's nickel catalyst is shaken with hydrogen until 102 cc. of hydrogen are absorbed. The mixture is filtered, the filtrate diluted with water and extracted with 10 cc. of petroleum ether. The petroleum ether extract is chilled at $-10°$ C. for one-half hour and then centrifuged. The white waxy residue after washing with petroleum ether several times is dissolved in ether and oxidized by shaking with silver oxide in the presence of anhydrous magnesium sulfate. By concentrating under vacuum, the product is obtained as a golden yellow oil.

| | Carbon | Hydrogen |
|---|---|---|
| Analysis: | | |
| Calculated for $C_{30}H_{48}O_2$ | 82.12 | 10.57 |
| Found | 82.41 | 10.37 |

I claim:
1. 2-methyl-3-dihydrophytyl-1,4-naphthoquinone.
2. 2-dihydrophytyl-1,4-naphthoquinone.
3. A compound of the formula:

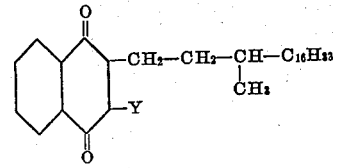

in which Y is a member of the group consisting of hydrogen and methyl.

MAX TISHLER.